3,403,202
METHOD AND APPARATUS FOR MAKING TOBACCO-SMOKE FILTERS
Sydney James Green and Norman Edwin Willis, London, England, assignors to Brown and Williamson Tobacco Corporation, Louisville, Ky., a corporation of Delaware
Filed Apr. 19, 1965, Ser. No. 449,255
Claims priority, application Great Britain, Apr. 20, 1964, 16,235/64
13 Claims. (Cl. 264—26)

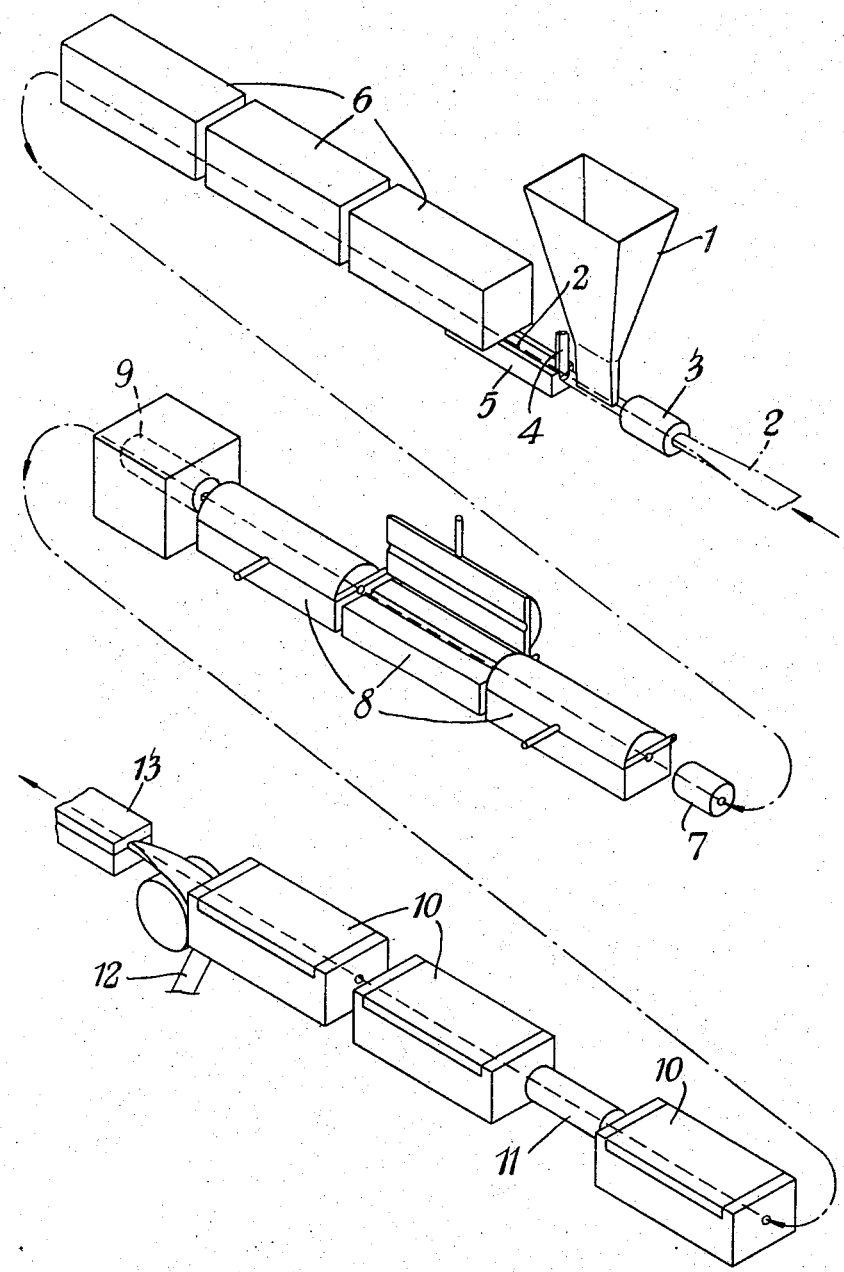

ABSTRACT OF THE DISCLOSURE

Particulate filter and bonding material deposited on and supported by a paper band during transformation to a bonded filter rod having a substantially uniform cross-section by means of passage of the paper wrap and the material carried thereby through heating dies to soften the bonding material throughout the cross-section to bond the filter material, sizing dies to assure uniformity of cross-section of the rod, and cooling dies for cooling the bonded rod which is, thereafter, cut to desired filter segment lengths.

---

This invention concerns improvements relating to tobacco-smoke filters and particularly to a method and apparatus for their manufacture.

The use of granular or powdered materials as components in filters for cigarette smoke is already known. However, the incorporation of these materials into filters in such a manner as to give even distribution in the filter and to avoid losses during manufacture and use is a problem. Proposals intended to solve this problem, for example distribution of the powder or granules within a fibrous mass or sheet of other filtering material or enclosure of the powder or granules in a cartridge or between filter plugs, or between a filter plug and the tobacco rod, have met with only limited success. The even distribution may entail an undesirably slow rate of production and difficulties may be encountered in maintaining the content of granular material at a reasonably constant level from filter-tip to filter-tip.

An object of the present invention is to provide a means of rapid and convenient continuous manufacture of filter rods or plugs consisting of powdered or granular materials, with little or no risk of losses during manufacture or subsequent use.

According to the invention, a method of producing a tobacco-smoke filter comprises mixing a powdered or granular tobacco-smoke filter material with a powdered or granular thermoplastic plastics material and heating the mixture to cause the particles of the filter material to become bonded by the thermoplastic material.

The bonding material may comprise polyethylene, polypropylene, polystyrene or a polyethylene copolymer with a vinyl or acrylyl ester. It may be a polyethylene/wax composition containing up to 40% of the wax component. The filter material may be any adsorbent or absorbent material with a desirable effect on cigarette smoke, which is available in powdered or granular form, for example charcoal, silica gel, zeolites, perlite, sepiolite, activated alumina, magnesium silicate or mixtures thereof or the like. The particle size of this material may be chosen to provide a desirable porosity of the resultant mass and is suitably between 10 and 80 mesh (British Standards Specification). For ease of working, it is preferably between 20 and 50 mesh and the particle sizes of the two materials are substantially the same. Preferably, the bonding material is present in a proportion between one part to eight parts and one part to three parts by weight of the filter material. The starting mixture may also contain additives or fillers.

Advantageously, the mixture is brought to rod form and is bonded while supported by a band in which the mixture is enrobed. The band may be a paper band coated with a thermoplastic material, for example polyethylene.

Apparatus for carrying out the aforesaid method may comprise means for feeding a mixture of powdered or granular filter material and powdered or granular bonding material to an enrobing band and a sequence of heated and cool dies through which the enrobed mixture is passed to effect bonding and to bring the mixture to rod form.

One manner of carrying the invention into effect will now be more fully described by way of example and with reference to the accompanying drawing, which illustrates a filter-producing apparatus in diagrammatic perspective view. The components of the apparatus are in fact arranged in one continuous straight line. They are shown in divided sections for ease of illustration only.

Granular bonding agent and granular filter material, intimately mixed, are fed from a hopper 1 to a band of paper 2, preferably coated with polyethylene, passing beneath the said hopper. The level of the mixture in the hopper 1 is preferably kept substantially constant. This may be achieved by providing a larger, upper, hopper with a dispensing chute projecting into the hopper 1. The paper 2 is introduced below the hopper and through a guide 3 which forms the paper so that it has, under the said hopper, a channel shape with a rounded bottom and upright sides. Just beyond the hopper 1, the paper band 2 passes under a gate device 4, which regulates the level of the granular material, and over a member 5 with a channel of flattened U-shape.

The paper band 2, supported in the channel of the member 5, passes below one or more (as shown, three) infra-red electrical heaters 6 extending along the line of movement of the band and provided with reflectors shaped to direct the infra-red rays normally to the said line. The heaters 6 serve to preheat the granular mixture on the band 2 to the stage at which the bonding agent just begins to soften. The preheated mixture passes on the band into a ring die 7, or a conventional garniture such as is used in cigarette machines, whereby the paper band 2 is folded around the mixture to form a "rod" enrobed in the paper.

This rod passes through one or more (as shown three) electrically heated dies 8 to complete the softening of the bonding agent and to ensure firm bonding of the granules of the filtering material to one another, as well as bonding of the paper band 2 to its contents. As indicated, each of the dies 8 is divided parallel to the line of movement of the rod. The temperature in the dies 8 should be such as to produce softening of the bonding agent employed, while avoiding risk of decomposing or otherwise impairing either the said agent or the filter material. Each of the dies 8 is of slightly larger circumference than the circumference required for the final rod. A hot-air stream may advantageously be introduced into the die to reduce frictional drag on the rod.

The dies 8 may, if desired, be followed by a heated sizing die 9 or by a combination of sizing dies, separated by one or more heated dies similar to the dies 8.

The enrobed and heated rod then passes to one or more (as shown three) dies 10 cooled by a circulated refrigerant, suitably of a halogenated hydrocarbon type. This sequence of cool dies may also include a sizing die 11. Preferably, the dies 10 are also divided parallel to the line of movement of the rod and provision is made for dried refrigerated air to be introduced to the outer surface of the rod by way of a series of radially disposed small holes. This flow of air not only assists in setting the rod in the desired size with an effective joint between the edges of the paper band 2, but also acts as an air bearing and reduces the risk of condensation of atmospheric moisture. The circumference of the cool dies is slightly less than that of the heated dies and may be slightly larger than the circumference of the final rod.

From the last die 10, the completed rod passes on to a conventional endless cigarette-machine tape 12 which provides the traction for the movement of the paper band and rod through the apparatus and carries the finished rod through a guide 13 or garniture to a conventional cut-off device which divides the rod into suitable lengths for future processing into filter-tip cigarettes.

Before or beyond the cut-off device, an additional heating device may optionally be introduced to ensure complete bonding. This may suitably be a di-electric heating device operating at 20–40 megacycles, although higher frequencies can be used. Preferably, pairs of electrodes on opposite sides of the rod are so linked together as to be at substantially the same voltage and are so positioned that the path between electrodes on opposite sides of the rod is appreciably less than the linear distance between the electrodes of each linked pair. This ensures that the energy transmitted across the diameter of the rod is greater than that transmitted along the length of the rod and so produces more efficient heating in the inner portions of the rod.

If desired, the mixture in the paper band may be supported upon an endless tape during part of its passage through the apparatus. Thus, for example, it may be so supported, from a point just beyond the hopper, through a folding means including a garniture, through a preliminary heating means and through a guide, the tape being then led away to leave the enrobed mixture to pass to the heated and cool dies.

The following is a specific example, using apparatus such as has been described with reference to the drawing:

Granules of activated charcoal (Sutcliffe Speakman, Grade 207C) and granules of polyethylene (Imperial Chemical Industries, Grade W.V.G.), both of mesh size 20–50, were mixed in a proportion of 8 to 1. The mixture was fed continuously from a constant-level hopper 1 to a band 2 of polyethylene-coated paper, 27.5 mm. wide, travelling below the hopper at a rate of 85 feet/min.

The mixture then passed below three infra-red heaters 6, was formed into a rod by a ring die 7 and passed immediately into a set of three dies 8.25 mm. in circumference, heated to about 200° C. and supplied, inside the dies, with a hot air stream at a temperature of about 250° C.

The rod was immediately cooled to a temperature of about 0° C. in a series of four cool dies 10, 24.8 mm. in circumference, into the interior of which dry refrigerated air was introduced through holes of 0.015 inch diameter at a pressure of 7–8 lbs./sq. in.

A cut-off device cut the rod into 90 mm. lengths.

Filters produced from the rod material were firmly bonded and even in packing and had a circumference of 24.6 mm. with a coefficient of variance of 0.19%.

We claim:
1. A method for forming a bonded charcoal filtering segment for use with a cigarette or the like, which comprises depositing a homogeneous particulate mixture of which a major portion is smoke filter material and a minor portion is thermoplastic plastics material into a U-shaped trough defined by a travelling paper wrapper, removing material in excess of that required for the final rod, forming said paper wrapper and particulate mixture into a paper wrapped rod, heating the mixture to cause the particles of the filter material to become bonded by the thermoplastic material, and partially cooling said rod in a cooling means to substantially solidify the thermoplastic material.

2. A method according to claim 1, wherein the paper wrapper is coated with a thermoplastic material thereby to cause a bonding of the particulate material to the paper.

3. A method according to claim 1, wherein the particulate mixture is heated by at least one electrically heated dies having an internal circumference which is slightly larger than that of the final rod form to be produced.

4. A method according to claim 1, wherein the circumference of the cooling dies is slightly less than that of the heated dies, but slightly larger than that of the final rod.

5. A method according to claim 1, wherein the particle sizes of said two materials are substantially the same.

6. A method according to claim 5, wherein the particle sizes of the materials are between 20 and 50 mesh.

7. An apparatus for forming a bonded adsorbent filter, said apparatus comprising in combination means for feeding a paper wrapper to a discharge means for the discharge of a homogeneous particulate mixture of filter material and bonding material and forming said paper wrapper into a U-shaped trough for receipt of the same, means for depositing said homogeneous particulate mixture of filter material and bonding material into said trough formed in said travelling paper wrapper, means for removing material in excess of that amount required for the final filter, a forming and wrapping means into which the paper wrapper and particulate mixture supported thereby travels for forming and wrapping the wrapper and particulate mixture into a rod, a heating means that receives the formed rod for bonding the particulate mixture, and a cooling means into which the bonded rod passes for substantially cooling the rod to substantially maintain a uniform cross section of the bonded particulate mixture within the paper wrapping material throughout the length of the rod.

8. The apparatus of claim 7 wherein said heating means comprises at least one electrically heated die having an internal bore which is slightly larger than that of the final rod form to be produced.

9. The apparatus of claim 7 wherein said cooling means comprises at least one cooling die having an internal bore which is slightly larger than that of the final rod.

10. The apparatus of claim 7 which further comprises at least one electrical heater which preheats the deposited bonding material so that said bonding material will be in a partially softened condition for forming said mixture into a rod within said forming means.

11. The apparatus of claim 8 wherein a fluid is introduced into said bore of the electrically heated die thereby to reduce frictional drag.

12. The apparatus of claim 9 wherein a fluid is introduced into said bore of the cooling die.

13. The apparatus of claim 12 wherein the fluid introduced to the die bore is dry refrigerated air thereby to substantially prevent deactivation of the filter material by moisture condensation and reduce frictional drag.

References Cited

UNITED STATES PATENTS

| | | | |
|---|---|---|---|
| 3,039,908 | 6/1962 | Parmele. | |
| 3,217,715 | 11/1965 | Berger et al. | 131—267 X |
| 3,318,317 | 5/1967 | Sproull et al. | 131—265 |
| 3,320,110 | 5/1967 | Gallagher. | |
| 3,088,467 | 5/1963 | Lanore | 131—84 X |

FOREIGN PATENTS 757,841  9/1956  Great Britain.

ROBERT F. WHITE, *Primary Examiner.*

T. J. CARVIS, *Assistant Examiner.*